United States Patent Office 3,745,141
Patented July 10, 1973

3,745,141
SULPHONATED POLYETHERS
Lucien Bonnard and Rene Pich, Lyon, and Alain Palsky, Calvire, France, assignors to Societe Rhodiaceta, Paris, France
No Drawing. Original application Oct. 28, 1968, Ser. No. 771,358. Divided and this application Feb. 16, 1971, Ser. No. 115,750
Int. Cl. C08g 5/00, 5/02; C07c 143/50
U.S. Cl. 260—40 R
12 Claims

ABSTRACT OF THE DISCLOSURE

The invention provides novel aliphatic/aromatic polyethers containing sulphonate groups which may advantageously be incorporated in polyesters or polyamides as a dispersion or, in the case of polyesters, as part of the polymer molecule, to improve their affinity for basic dyestuffs.

---

This is a division of application Ser. No. 771,358, filed Oct. 28, 1968, now Pat. No. 3,663,509.

The present invention relates to new sulphonated polyethers used as agents for modifying polyamides and polyesters to improve their dyeing affinity, in particular towards basic dyestuffs.

Polyesters and polyamides have found numerous applications in the textile field. However they do not possess sufficiently active and numerous acid sites to be able to absorb basic dyestuffs which have the advantage over acid or disperse dyestuffs of a very much greater covering power with more vivid shades.

Several processes have been described for improving the dyeing properties of such polymers towards basic dyestuffs. It is for example known to prepare spinnable and film-forming copolyesters from a diacid, or an ester-forming derivative thereof, and an aliphatic or cycloaliphatic glycol in the presence of a compound which simultaneously contains at least one functional group forming an ester and at least one sulphonate group in the form of a metal salt, for example potassium 3,5-di-(methoxycarbonyl)-benzenesulphonate.

In the case of the polyamides it has also been proposed to prepare spinnable and film-forming copolymers from a polymerisable aminoacid or from an essentially equimolecular mixture of a diacid and a diamine and a difunctional aromatic compound containing a sulphonate group in the form of a metal salt, for example potassium 3,5-dicarboxybenzenesulphonate.

The copolymers thus obtained however suffer from the disadvantage of having a relatively low melting point compared with that of the corresponding homopolymers, so that the filaments obtained from these copolymers have a lower heat resistance than that of filaments produced from homopolymers. This can be troublesome where both types of filaments are to be treated on the same device or as a mixture.

At the highest contents of sulphonate groups the average molecular weight of the copolymers is less than that of the homopolymers having the same viscosity in the fused state. It is thus difficult to achieve the high solution viscosities which are necessary for certain applications where high tenacities are sought. Furthermore the mechanical properties of the polymers are significantly reduced.

Wholly aromatic sulphonated polyethers are known as surface-active agents but cannot be used to modify the properties of polyamides and polyesters because they are only very slightly compatible with these polymers and on mixing yield coarse dispersions. Because of the fact that they are infusible and insoluble they can for practical purposes not be copolymerised.

The present invention provides new arylaliphatic sulphonated polyethers of the formula:

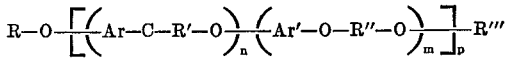

in which Ar and Ar′, which may be identical or different represent divalent aromatic radicals which are monocyclic, condensed polycyclic or polycyclic bonded directly or via an alkylene radical which is unsubstituted or substituted by aliphatic or aromatic substituents, or joined by a group such as —SO$_2$—, —CO—, or —NH—, in particular the following radicals:

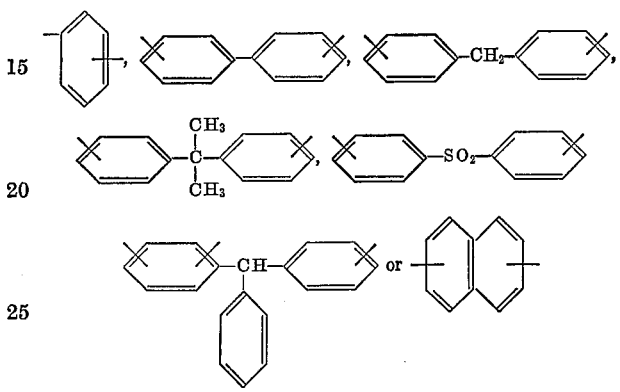

R′ and R″, which may be identical or different, represent alkylene or aralkylene radicals which may optionally contain ether, sulphide or amine groups, in particular the following radicals: —(CH$_2$)$_a$— (where $a$ is from 2 to 10 inclusive)

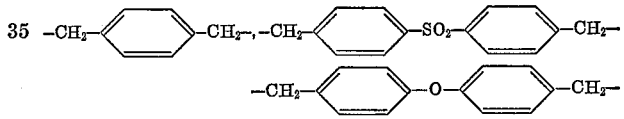

—CH$_2$—CH$_2$—O—CH$_2$—CH$_2$—, or

—CH$_2$—CH$_2$—O—CH$_2$—CH$_2$— or

—CH$_2$—CH$_2$—O—CH$_2$—CH$_2$—O—CH$_2$—CH$_2$—.

R and R‴ represent terminal radicals which may consist of one of the radicals —Ar—OH, —Ar′—OH, —R′—OH or —R″—OH or may arise from monofunctional compounds which serve to limit the chains in the reaction of formation of the polyether, such as the radicals:

—(CH$_2$)$_b$CH$_3$ (where $b$ is 0 to 9 inclusive)

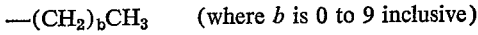
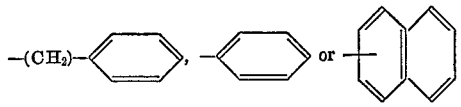

$n$, $m$ and $p$ represent itegers so chosen that the total number of ether-oxide groups is at least 4 and is preferably greater than 8 (i.e. $p(m+n)$ is at least 2),
with at least one of the radicals represented by the symbols Ar,
Ar′, R, R′, R″ and R‴ being substituted by a —SO$_3$M radical (with M designating hydrogen or a metal, especially an alkali metal or ammonium) carried by a carbon atom which, in the case of the groups Ar and Ar′, may form part of the aromatic radicals or be linked to these by an aliphatic chain.

These polyethers may be obtained by two different methods, namely: (1) by reaction of an alkali metal diphenate with an alkylene dihalide followed by sulphonation and neutralisation of the resulting sulphonic acid with a base; or (2) by reaction of starting materials which have already been sulphonated.

These sulphonated polyethers modify polyesters and polyamides by introducing active groups in sufficient amount to allow the latter to be dyed with basic dyestuffs. Thus polyester-ethers may be prepared by copolymerisation of reagents which form polyesters with the sulphonated polyethers of the invention possessing terminal hydroxyl groups. Alternatively spinnable and film-forming compositions may be made consisting of a fine dispersion of a sulphonated polyether having blocked terminal groups in a polyester or polyamide. In the first case, the block copolymers obtained have a melting point which is closer to that of the homopolyesters than that of the sulphonated copolyesters described hitherto, and, in the second case, the compositions have physico-chemical characteristics which are practically unchanged as compared with those of the initial polyester or polyamide.

As compared with entirely aromatic polyethers, the polyethers of the invention offer the advantage of forming fine dispersions by mixing with polyamides and polyesters and of being capable of easily copolymerising with polyesters, given that they are partly soluble in the glycol which serves to form the polyester.

The polyester-ethers of improved dyeing affinity are prepared by heating terephthalic acid or another suitable dicarboxylic acid, preferably in the form of a lower alkyl diester, an alkylene glycol or other suitable glycol and a suitable quantity of polyether in the presence of known transesterification and polycondensation catalysts, the reaction being carried out at low pressure until the desired viscosity has been obtained.

To facilitate the adsorption and fixing of the dyestuff, it is necessary for there to be at least 0.003 sulphonate group present per 100 g. of polyester-ether. Above 0.03 group per 100 g. the improvement introduced no longer significantly increases.

In the polymers thus obtained the chain consists essentially of units of formula:

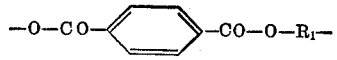

with 2–35% by weight of units of formula:

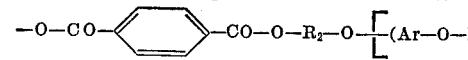

in which $R_1$ represents a linear alkylene radical containing 2 to 8 carbon atoms and $R_2$ an alkylene radical containing 2 to 10 carbon atom, and $q$ and $r$ represents 0 and the other 1, and $R'$, $R''$, $Ar$, $Ar'$, $n$, $m$ and $p$ have the significances given above.

If one wishes to incorporate the polyethers of the invention into polyamides or polyesters then this incorporation can be effected at any desired stage of the preparation of the starting polymer or of the manufacture of the filament. Thus the sulphonated polyether can be introduced during the pre-polymerisation or during the polymerisation itself and, in the case of the polyesters, during the transesterification, or it can be mixed with the polymer particles or fused polymer or incorporated during injection of the molten polymer into the spinning head.

The polyesters which have been modified in accordance with the present invention are principally derived from terephthalic acid and from a linear alkylene glycol having 2 to 10 carbon atoms or a cyclic glycol such as 1,4-dihydroxymethyl-cyclohexane. They are homopolyesters or copolyesters containing a small amount of a second diacid or second glycol.

The polyamides which may be used in the present invention are obtained by reacting an aminoacid or one of its derivatives, an essentially equimolecular mixture of a diacid and a diamine, or a mixture of several of these constituents, under conditions which are in themselves known.

The compositions according to the invention contain 0.2 to 25%, and preferably 0.2 to 15%, by weight of the polyether. This content must be adjusted depending on the degree of sulphonation of the polyether so that the number of $—SO_3M$ groups should be between 0.2 and 10 per 100 units of the polyester or polyamide.

In the case of the polyesters, where the accessibility of the active groups is reduced by the strong crystallinity it is advantageous to introduce more than 1.5 groups per 100 polymer units so as to obtain good dyeability.

In the case of the polyamides, where the diffusion of the dyestuffs is easier, this amount can be reduced, generally to one group per 100 polymer units.

In the case of the polyesters a copolymer is of course obtained if a polyether containing reactive groups is introduced during the preparation of the polyester, and a composition is obtained if a polyether containing non-reactive blocked end-groups is introduced.

In the case of the polyamides a composition is always obtained regardless of whether polyethers with blocked or non-blocked end-groups are added during the preparation.

The presence of metal sulphonate groups in the polyamides reduces the dyeing affinity towards acid dyestuffs and this makes it possible to obtain contrasting shades by dyeing mixtures of filaments obtained from these polymers with filaments obtained from unmodified polyamides.

The examples which follow are given by way of illustration.

EXAMPLE 1

The following are introduced with stirring into a 1 litre autoclave:

|  | G. |
|---|---|
| Dimethyl terephthalate | 388 |
| Ethylene glycol | 310 |
| Sulphonated polyether prepared as indicated below | 31.5 |
| Manganese acetate | 0.132 |
| Antimony oxide | 0.29 |

The alcohol interchange starts at 120° C. and the theoretical amount of methanol corresponding to a complete reaction is achieved when the temperature has reached 210° C. The excess glycol is distilled off, a vacuum is then applied to the apparatus and the temperature raised to 280° C. After one hour's polycondensation under 0.3 mm. of mercury, the resulting polymer has an intrinsic viscosity, measured on a 1% strength solution in o-chlorophenol at 25° C., of 0.62 and a softening point of 263° C.

The polyether, which dissolves in the glycol during the heating, does not precipitate at any stage of the polymerisation. It becomes introduced into the chain by etherification of the terminal phenol groups by the glycol followed by esterification.

On extrusion at 280° C. through a spinneret having 23 holes each of 0.23 mm. diameter, stretching by the ratio of 5.2 over a finger heated to 90° C. and heating setting on a plate at 150° C., a 71 denier yarn is obtained having a tenacity of 4.2 g./denier and an elongation at break of 16%.

On dyeing at 98° C. in the presence of o-phenylphenol as the carrier, in a 50 cm.$^3$ bath containing 0.02 g. of Genacryl Blue 6 G (Colour Index No. 42,025) per gram of yarn, a deep blue colour is obtained and the dyestuff in the bath is rapidly exhausted. A similar result is obtained on dyeing at 120° C. under pressure without a carrier.

In order to prepare the sulphonated polyether, 225 parts of a polyether derived from bisphenol A and from dichlorobutane, of formula:

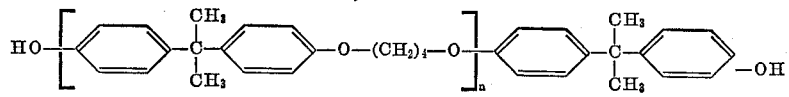

and having a molecular weight of 2,000 are dissolved in 1,000 parts of tetrachlorethane and the solution cooled to −10° C. A solution consisting of 47 parts of chlorosulphonic acid in 100 parts of tetrachlorethane is added slowly to the solution thus obtained and the mixture is kept for 12 hours at 0° C. in such a way as to allow the hydrochloric acid formed to escape.

The reaction product is dissolved in water and the tetrachlorethane is distilled off azeotropically. On addition of barium hydroxide the sulphuric acid formed in small amounts precipitates as barium sulphate and is removed by filtration. The sulphonic acid is neutralised with potassium hydroxide and the potassium salt thus formed is precipitated by adding absolute ethyl alcohol.

The potassium salt of the sulphonated polyether has a softening point of 170° C. and contains 4.1% of sulphur in place of the 4.9% to be expected for a quantitative reaction of the chlorosulphonic acid.

EXAMPLE 2

The following are introduced into a 1 litre autoclave:

| | G. |
|---|---|
| Dimethyl terephthalate | 388 |
| Ethylene glycol | 310 |
| Sulphonated polyether prepared as indicated below | 16.5 |
| Manganese acetate | 0.132 |
| Antimony oxide | 0.29 |

The polymerisation yields a polyester-ether having a softening point of 262° C. and an intrinsic viscosity of 0.61 measured on a 1% strength solution in o-chlorophenol at 25° C.

The yarns obtained from these polymers have the following characteristics:

Gauge: 70 deniers/23 filaments
Tenacity: 4 g./denier
Elongation at break: 21%

Deep red filaments are obtained on dyeing with Genacryl Red 6 B (Colour Index No. 48,020) in the presence of a carrier, or at 120° C. without a carrier.

The sulphonated polyether is prepared by copolymerisation of bisphenol A and potassium bisphenol A-disulphonate with dichlorobutane in dimethylsulphoxide so as to yield a product having a sulphur content of 7.7%. This polyether has a melting point above 250° C.

EXAMPLE 3

The following are introduced into a 1 litre autoclave:

| | G. |
|---|---|
| Dimethyl terephthalate | 388 |
| Ethylene glycol | 310 |
| Sulphonated polyether prepared as indicated below | 43 |
| Manganese acetate | 0.132 |
| Antimony oxide | 0.29 |

The resulting polymer has the following characteristics:

Softening point: 259° C.
Intrinsic viscosity: 0.53 (measured in a 1% strength solution in o-chlorophenol at 25° C.)

The filaments obtained from this polymer have a tenacity of 3.4 g./denier and an elongation at break of 21%. On dyeing by means of Genacryl Blue 6 G (Colour Index No. 42,025) in the presence of a carrier, deep blue filaments are obtained.

On dyeing with Celliton Fast Blue FFR (Colour Index No. 61,505) without a carrier, medium blue filaments are obtained.

The polyether used is prepared by sulphonation of the same polyether as in Example 1 so that it contains 2.1% of fixed sulphur after neutralisation with lithium hydroxide.

EXAMPLE 4

A sulphonated polyether prepared as indicated below is reacted with dimethyl terephthalate and ethylene glycol in an amount of 4% based on the dimethyl terephthalate.

The resulting polymer may be spun and dyed in deep shades with the basic dyestuffs used in the preceding examples, in the presence of a carrier, or at 120° C. under pressure.

The polyether used is prepared by sulphonation, so as to give 7.5% of fixed sulphur after neutralisation with potassium hydroxide, of a polyether derived from hydroquinone and dibromohexane, of formula:

$$HO-\left[\underset{}{\bigcirc}-O-(CH_2)_6-O\right]_n-\underset{}{\bigcirc}-OH$$

and having a molecular weight of 900.

EXAMPLE 5

The following are introduced into a 1 litre autoclave, with stirring:

| | G. |
|---|---|
| Dimethy terephthalate | 388 |
| Ethylene glycol | 310 |
| Sulphonated polyether prepared as indicated below | 30 |
| Hydrated manganese acetate | 0.132 |
| Antimony oxide | 0.29 |

After transesterification, distillation of the excess glycol and polycondensation for 1 hour 15 minutes at 280° C. under 0.3 mm. of mercury, a composition is obtained which has a specific viscosity (measured on a 1% strength solution in o-chlorophenol at 25° C.) of 0.66 and a softening point of 260° C. The polyether is dispersed in the form of particles of the order of 5μ.

On extrusion at 283° C. through a spinneret having 23 holes each 0.30 mm. in diameter, and stretching in a ratio of 4.3, a yarn is obtained which has a tenacity of 36 g./tex. and an elongation at break of 30%.

The yarn is dyed in a bath containing 2% of Genacryl Red 6 B (Colour Index No. 48,020) and 0.5% of benzoic acid as a carrier. At 98° C. the dyestuff in this bath is exhausted in about 45 minutes. A red colour is obtained on the yarn, which has excellent resistance to domestic washing and to dry cleaning.

In order to prepare the sulphonated polyether the following procedure is adopted. The phenates of bisphenol A and of sodium bisphenol A-disulphonate are first of all prepared by reaction with sodium hydroxide and are dried by azeotropic extraction with chlorobenzene.

The following are introduced into a flask fitted with a stirrer and a condenser:

| | |
|---|---|
| Sodium bisphenate | g— 102 |
| Sodium bisphenate-di(sodium sulphonate) | g— 59.5 |
| Dichlorobutane | g— 63.5 |
| Dimethylsulphoxide | cm.³— 200 |

The mixture is gradually heated to 160° C. The suspension, which is initially fluid, becomes increasingly viscous. After one hour's heating, the reaction is stopped by adding benzyl chloride which blocks the phenol groups which remain free. The mass is diluted with ethanol. The polymer which has precipitated is filtered off, washed until dimethylsulphoxide is completely removed, and dried.

It contains 4.8% of sulphur and has the following recurring units:

$$-O-\underset{}{\bigcirc}-\underset{CH_3}{\overset{CH_3}{\underset{|}{C}}}-\underset{}{\bigcirc}-O-(CH_2)_4-\text{ and}$$

$$-O-\underset{SO_3Na}{\bigcirc}-\underset{CH_3}{\overset{CH_3}{\underset{|}{C}}}-\underset{SO_3Na}{\bigcirc}-O-(CH_2)_4-$$

in the ratio of three non-sulphonated units per sulphonated unit.

EXAMPLE 7

The same polyether as that described in Example 1 is introduced into a polyester of specific viscosity of 0.79 (measured on a 1% strength solution in o-chlorophenol at 25° C.), to the extent of 8% by weight, by mixing the powders and passing into an extruder provided with a metering pump and a spinneret so as to produce, in a single operation, a yarn which is stretched in a ratio of 4. This yarn has a tenacity of 32 g./tex. and an elongation at break at 32%. The polyether is distributed in the polyester in the form of small rods of width less than $4\mu$ and of length up to $20\mu$.

The yarn is dyed under the same conditions as in Example 5. The bath is exhausted after about one hour.

EXAMPLE 7

A polyether, prepared as indicated below, is finely ground in the presence of glycol in a ball mill and, as in Example 5, is introduced into a polymerisation autoclave in an amount of 3% based on the methyl terephthalate.

A white opaque polymer is obtained which can be spun without difficulty and has a dyeing affinity which is comparable to that of the polymer obtained according to Example 5.

The polyether is prepared by the method used in Example 5 but starting only from sodium bisphenol A-disulphonate and dichlorobutane. It then contains 13.2% of sulphur and is infusible.

EXAMPLE 8

The following compound, prepared from bisphenol A, sodium 4-hydroxyphenylsulphonate and dichlorobutane is introduced to the extent of 5% under the conditions of Example 7:

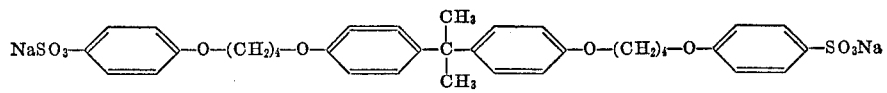

The resulting polyester has a good dyeing affinity towards basic dyestuffs.

EXAMPLE 9

A polyether prepared as indicated below is introduced into the polyester to the extent of 8% by weight after the transesterification stage. The resulting polyester, which has a specific viscosity of 0.59 measured on a 1% strength solution in o-chlorophenol at 25° C., contains a fine dispersion of polyether. On spinning through a spinneret having 23 holes each of 0.30 mm. diameter, a yarn having a tenacity of 27 g./tex. and an elongation at break of 30% is obtained, which dyes to a deep shade in the presence of Genacryl Blue 6 G (Colour Index No. 42,025).

The sulphonated polyether is prepared by polycondensation of 1 mol of sodium hydroquinone-sulphonate and 1 mol of bisphenol A with two mols of dibromohexane followed by blockage of the terminal phenate groups by adding an excess of bromohexane. The polyether thus obtained contains the recurring units:

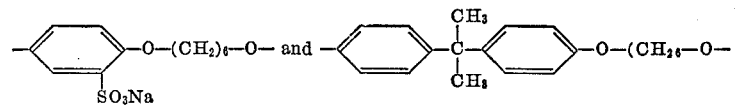

in approximately equal numbers.

EXAMPLES 10, 11, 12 AND 13

A spinnable polyamide-66, for comparison purposes with various mixtures of polyamides with sulphonated polyethers, is first prepared. 5,240 g. of a 50% by weight solution of hexamethylene diammonium adipate and 4.5 g. of pure acetic acid to act as a viscosity stabiliser are introduced into a stainless steel autoclave. After purging the air with a current of nitrogen, the pressure is slowly raised to 18 kg./cm.$^2$ and the temperature to 220° C. Water is then removed by distillation whilst the pressure is kept constant, and the pressure is then gradually reduced to atmospheric pressure whilst the temperature is raised to 275° C. After having maintained these conditions for 1 hour, the polymer is extruded as a continuous rod which is cooled and granulated.

The granules are fused and extruded through a spinneret having 23 holes each of 0.23 mm. diameter. The filaments are stretched in the ratio of 4 so as to yield an overall gauge of 7.78 tex. and an elongation at break of 27%.

Various compositions are prepared under the same conditions from the reagents indicated in Table I.

TABLE I

| Example | 10 | 11 | 12 | 13 |
|---|---|---|---|---|
| 50% by weight aqueous solution of hexamethylene diammonium adipate, in g | 5,240 | 5,240 | 5,240 | 5,240 |
| Acetic acid in g | 4.5 | 4.5 | 4.5 | 4.5 |
| Sulphur content of the polyether prepared as indicated below, percent by weight | 4 | 7.7 | 10.6 | 12.3 |
| Percentage per weight of polyether in the polyamide | 3 | 3 | 3 | 3 |
| Relative viscosity measured at 25° C. on an 8.4% solution in 90% strength formic acid | 32 | 33 | 31 | 34 |
| Gauge of the yarns (23 filaments) in tex. | 6.90 | 8.18 | 9.08 | 7.78 |
| Tenacity in g./tex | 42.5 | 41.5 | 40 | 41 |
| Elongation at break, percent | 35 | 32 | 28 | 31 |

The samples of the yarns obtained as well as a sample of a yarn obtained from the comparison polyamide are dyed with Basic Blue 11 (Colour Index No. 44,040) in identical dye baths (concentration and pH) and under the same conditions:

Ratio of weight of yarn/dyestuff: 200/1
Bath temperature: 98° C.
Duration: 1 hour The amount of dyestuff remaining in the bath is determined by spectrophotometric measurement using a Beckmann DK 2A spectrophotometer. From this, the percentages of dyestuff absorbed by the various yarns are deduced. The results obtained are summarised in Table II.

TABLE II

| Example: | Percentage of dyestuff absorbed |
|---|---|
| Comparison | 40 |
| 10 | 61 |
| 11 | 67 |
| 12 | 89 |
| 13 | 96 |

This table illustrates the improvement in the dyeing affinity towards basic dyestuffs which is introduced into the polyamides by the presence of sulphonated polyethers, this improvement being the more marked the higher the amount of sulphur in the polyether.

Using a similar method it is possible to verify that at a constant percentage of polyether phase in the polyamide the resistance towards acid dyestuffs of the polymers modified in this way is the greater, the higher is the sulphur content.

To prepare the polyethers the following are reacted in 300 cm.³ of water heated to 80° C. so as to obtain the corresponding phenate:

| | G. |
|---|---|
| Bisphenol A | 228 |
| Caustic soda | 80 |

This solution together with one mol of dichlorobutane is introduced into a 1 litre autoclave and gradually heated to 160° C. over the course of 3 hours. After removing the water and sodium chloride, a polyether containing the recurring unit:

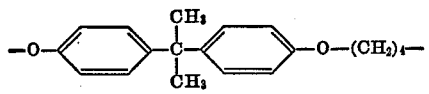

and having a molecular weight of about 3,000, measured by ebullioscopy in toluene, is obtained quantitatively. 121 g. of this polyether are suspended in 500 cm.³ of tetrachloroethane and cooled to −10° C. The amount of chlorosulphonic acid required to obtain the desired sulphur content is then added, dissolved in 100 cm.³ of tetrachlorethane, knowing that the reaction is practically quantitative and that it requires 27 g. of the material to obtain a sulphur content of 4% as in Example 10. The mixture is then kept at 0° C. until the evolution of the HCl formed is complete. Water is added to the gelatinous suspension obtained and the tetrachlorethane is distilled off azeotropically. After neutralisation with sodium hydroxide, the sulphonated polyether precipitates. It contains the following nonsulphonated and sulphonated recurring units:

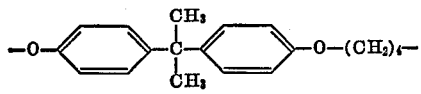

and

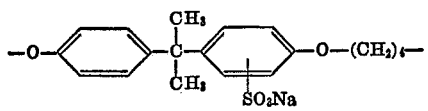

in such amounts that the sulphur contents indicated in Table I are respectively obtained.

We claim:
1. A composition consisting essentially of a heterogeneous mixture of a synthetic linear polyester, obtained by polycondensation of terephthalic acid with a linear alkylene glycol having two to ten carbon atoms or a cyclic glycol, with 0.2 to 25% by weight of a sulphonated polyether consisting essentially of units of the formula:

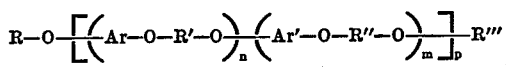

in which Ar and Ar', which may be identical or different, represent radicals of the formula:

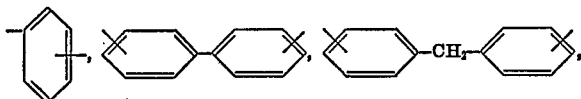

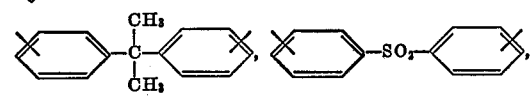

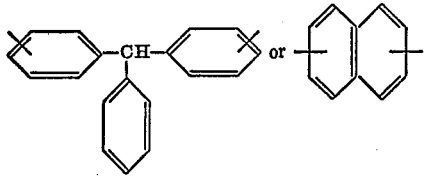

R' and R", which may be identical or different, represent radicals of formula:

—(CH$_2$)$_a$   (where $a$ is 2 to 10 inclusive),

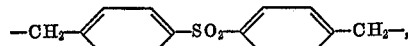

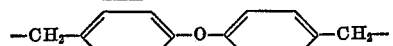

—CH$_2$CH$_2$—O—CH$_2$CH$_2$—, or

—CH$_2$CH$_2$—O—CH$_2$CH$_2$—O—CH$_2$CH$_2$—,

R and R''' represent radicals of formula —Ar—OH, —Ar'—OH, —(CH$_2$)$_b$—CH$_3$ (where $b$ is from 0 to 9),

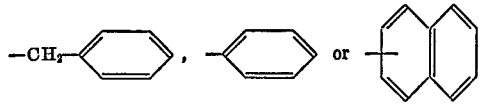

and $n$, $m$ and $p$ represent integers such that the total number of ether-oxide groups is at least 4, at least one of the radicals represented by the symbols Ar, Ar', R, R', R", and R''' being substituted on an aromatic nucleus by a —SO$_3$M group (M designating hydrogen, and alkali metal or ammonium).

2. A composition according to claim 1 in which the sulphonated polyether contains about 0.0085 to 1.5 SO$_3$M groups per 100 grams of polyether.

3. A composition consisting essentially of a heterogeneous mixture of polyhexamethylene adipamide, with 0.2 to 25% by weight of a sulphonated polyether consisting essentially of units of the formula:

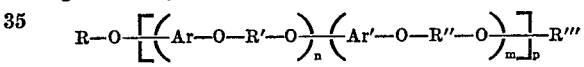

in which Ar and Ar', which may be identical or different, represent radicals of formula:

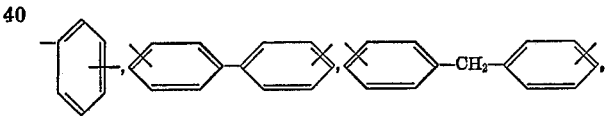

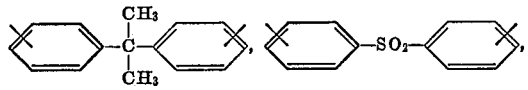

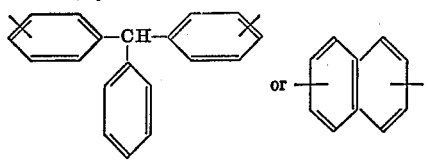

R' and R", which may be identical or different, represent radicals of formula;

—(CH$_2$)$_a$   (where $a$ is 2 to 10 inclusive),

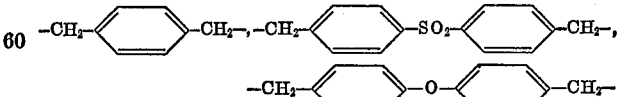

—CH$_2$CH$_2$—O—CH$_2$CH$_2$—, or

—CH$_2$CH$_2$—O—CH$_2$CH$_2$—O—CH$_2$CH$_2$—,

R and R''' represent radicals of formula —Ar—OH, —Ar'—OH, —(CH$_2$)$_b$—CH$_3$ (where $b$ is from 0 to 9),

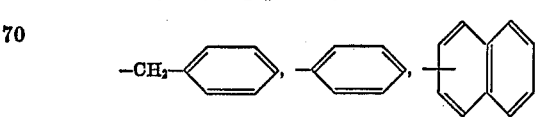

and $n$, $m$ and $p$ represent integers such that the total number of ether-oxide groups is at least 4, at least one of the radicals represented by the symbols Ar, Ar', R, R', R", and R''' being substituted on an aromatic nucleus by a —SO₃M group (M designating hydrogen, an alkali metal or ammonium).

4. A composition according to claim 3 in which the polyether is present to the extent of 0.2 to 15% by weight.

5. A composition according to claim 3 containing 0.2 to 10 —SO₃M groups per 100 polyamide units.

6. A composition according to claim 3 in which Ar and Ar' are each radicals of formula:

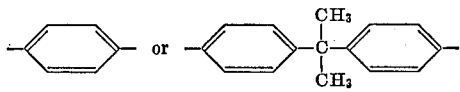

R' and R" are each radicals of formula:

—(CH₂)₄— or —(CH₂)₆— and R and R''' are each radicals of formula:

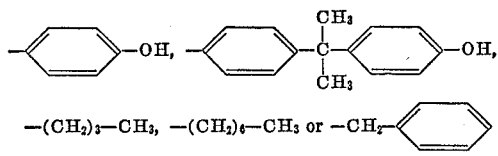

at least one benzene ring in each molecule of the polyether being directly substituted by a radical of formula —SO₃M (where M is hydrogen or an alkali metal or an ammonium).

7. A composition according to claim 3 dyed with a basic dyestuff.

8. A composition according to claim 3 in which the sulphonated polyether contains about 0.0085 to 1.5 SO₃M groups per 100 grams of polyether.

9. A composition according to claim 1 in which the polyether is present to the extent of 0.2 to 15% by weight.

10. A composition according to claim 1 containing 0.2 to 10 —SO₃M groups per 100 polyester units.

11. A composition according to claim 1 in which Ar and Ar' are each radicals of formula:

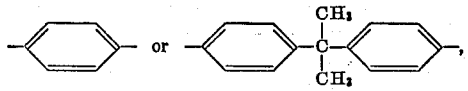

R' and R" are each radicals of formula:

—(CH₂)₄— or —(CH₂)₆— and R and R''' are each radicals of formula:

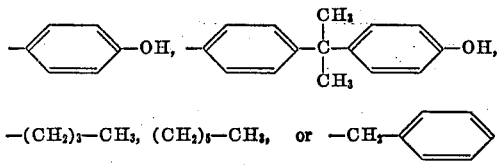

at least one benzene ring in each molecule of the polyether being directly substituted by a radical of formula —SO₃M (where M is hydrogen or an alkali metal or an ammonium).

12. A composition according to claim 1 dyed with a basic dyestuff.

References Cited
UNITED STATES PATENTS

| | | | |
|---|---|---|---|
| 3,381,057 | 4/1968 | Senoo et al. | 260—860 |
| 3,557,055 | 1/1971 | Bonnard et al. | 260—47 |
| 3,567,687 | 3/1971 | Lohwasser et al. | 260—49 |

WILLIAM H. SHORT, Primary Examiner

L. L. LEE, Assistant Examiner

U.S. Cl. X.R.

8—178, 179; 260—49, 785, 785 C, 505 C, 505 E, 512 C, 512 R, 857 R, 860

UNITED STATES PATENT OFFICE
CERTIFICATE OF CORRECTION

Patent No. 3,745,141　　　　Dated July 10, 1973

Inventor(s) L. Bonnard et al

It is certified that error appears in the above-identified patent and that said Letters Patent are hereby corrected as shown below:

Page 1, block 30, insert --Claims priority, France, 126,583, filed October 31, 1967 and France, 143,387, filed March 12, 1968.

Signed and sealed this 16th day of July 1974.

(SEAL)
Attest:

McCOY M. GIBSON, JR.　　　　　　　C. MARSHALL DANN
Attesting Officer　　　　　　　　　Commissioner of Patents